(12) United States Patent
Leimboeck et al.

(10) Patent No.: US 12,024,155 B2
(45) Date of Patent: Jul. 2, 2024

(54) DRIVE SYSTEM OF A PLUG-IN HYBRID VEHICLE AND METHOD FOR OPERATING SUCH A DRIVE SYSTEM

(71) Applicant: Dr. Ing. h.c. F. Porsche Aktiengesellschaft, Stuttgart (DE)

(72) Inventors: Martin Leimboeck, Krailling (DE); Bernhard Freiermuth, Bellheim (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 101 days.

(21) Appl. No.: 17/381,271

(22) Filed: Jul. 21, 2021

(65) Prior Publication Data

US 2022/0024439 A1    Jan. 27, 2022

(30) Foreign Application Priority Data

Jul. 27, 2020 (DE) ...................... 10 2020 119 674.1

(51) Int. Cl.
*B60W 20/00* (2016.01)
*F02N 19/10* (2010.01)

(52) U.S. Cl.
CPC ............ *B60W 20/00* (2013.01); *F02N 19/10* (2013.01); *B60W 2555/20* (2020.02); *B60W 2556/10* (2020.02); *B60W 2710/0688* (2013.01); *B60W 2710/246* (2013.01)

(58) Field of Classification Search
CPC .......... F02N 19/10; B60W 2710/0688; B60W 20/20; B60W 2710/246; B60W 2556/10; B60W 30/194; B60L 58/27

USPC ...................................................... 123/41.44
See application file for complete search history.

(56) References Cited

U.S. PATENT DOCUMENTS

| 3,134,374 | A | * | 5/1964 | Stevens | ................... F02N 19/10 219/205 |
|---|---|---|---|---|---|
| 4,395,623 | A | * | 7/1983 | Shimada | ............... H05B 3/141 219/505 |
| 6,915,763 | B2 | * | 7/2005 | Arisawa | ................... F01P 11/20 123/41.14 |
| 10,781,731 | B2 | | 9/2020 | Amin et al. | |
| 2008/0275600 | A1 | | 11/2008 | Rask et al. | |

(Continued)

FOREIGN PATENT DOCUMENTS

| DE | 10249541 A1 | 5/2004 |
|---|---|---|
| DE | 102008021424 A1 | 11/2008 |

(Continued)

*Primary Examiner* — Logan M Kraft
*Assistant Examiner* — Joshua Campbell
(74) *Attorney, Agent, or Firm* — LEYDIG, VOIT & MAYER, LTD.

(57) ABSTRACT

A drive system of a plug-in hybrid vehicle includes: an internal combustion engine; an electrical machine; an electrochemical storage device, which is configured to supply the electrical machine with electrical energy; and a conditioning system. The conditioning system is configured to precondition the electrochemical storage device and has an electric heating element. the conditioning system is configured, before the start of a journey, to activate a preconditioning function of the internal combustion engine and to preheat a coolant of the internal combustion engine by time-controlled activation of the electric heating element.

11 Claims, 1 Drawing Sheet

(56) References Cited

U.S. PATENT DOCUMENTS

| | | | | |
|---|---|---|---|---|
| 2009/0248228 A1* | 10/2009 | Miller | ................... | B60W 10/26 |
| | | | | 903/951 |
| 2011/0067665 A1* | 3/2011 | Beckmann | .............. | F02N 19/10 |
| | | | | 123/179.21 |
| 2013/0261932 A1* | 10/2013 | Okamoto | .............. | B60W 10/06 |
| | | | | 701/102 |
| 2014/0058647 A1 | 2/2014 | Haladyna et al. | | |
| 2014/0114515 A1 | 4/2014 | Porras et al. | | |
| 2015/0330352 A1* | 11/2015 | Ishimori | ................. | F02N 19/10 |
| | | | | 123/142.5 R |
| 2016/0318499 A1 | 11/2016 | Yamanaka et al. | | |
| 2018/0030865 A1* | 2/2018 | Amin | ..................... | B60K 6/445 |
| 2018/0334170 A1* | 11/2018 | Liu | ....................... | B60W 10/30 |
| 2020/0070679 A1* | 3/2020 | Wang | ..................... | B60L 58/21 |

FOREIGN PATENT DOCUMENTS

| | | | |
|---|---|---|---|
| DE | 102009042745 A1 | | 3/2011 |
| DE | 102010044923 A1 | | 4/2012 |
| DE | 102013216215 A1 | | 5/2014 |
| DE | 102015014872 A1 | | 7/2016 |
| DE | 102015014875 A1 | | 8/2016 |
| DE | 112014006172 T5 | | 10/2016 |
| DE | 102017116817 A1 | | 2/2018 |
| DE | 102017212504 A1 | | 1/2019 |
| JP | 05178070 A | * | 7/1993 |
| JP | 2004324439 A | * | 11/2004 |

\* cited by examiner

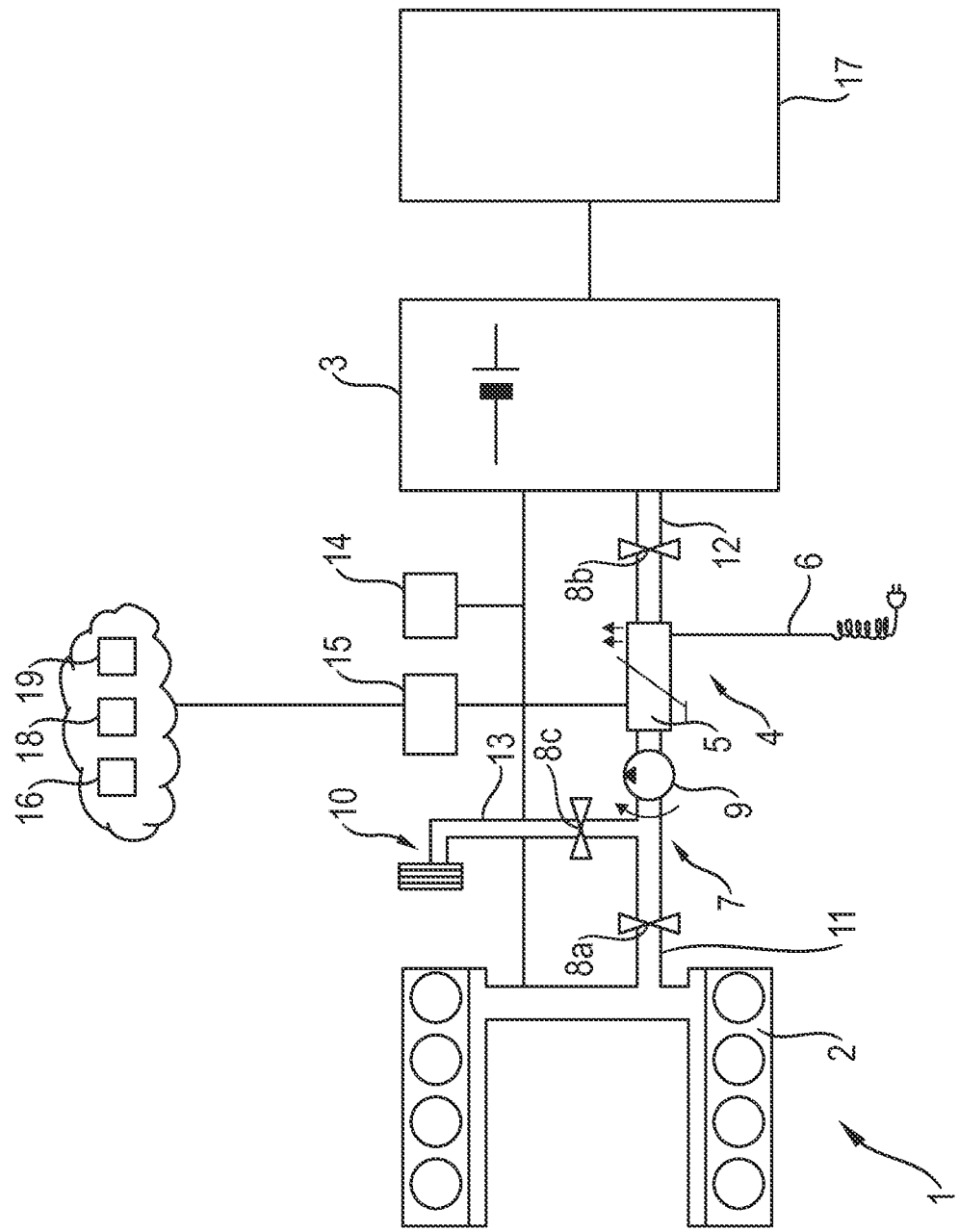

DRIVE SYSTEM OF A PLUG-IN HYBRID VEHICLE AND METHOD FOR OPERATING SUCH A DRIVE SYSTEM

CROSS REFERENCE TO RELATED APPLICATIONS

This application claims benefit to German Patent Application No. DE 10 2020 119 674.1, filed on Jul. 27, 2020, which is hereby incorporated by reference herein.

FIELD

The present invention relates to a drive system of a plug-in hybrid vehicle. The present invention relates additionally to a method for operating such a drive system.

BACKGROUND

Internal combustion engines, which are operated in particular with a fossil fuel, introduce a certain amount of fuel into the engine oil of the internal combustion engine during the cold-start phases. In conventional motor vehicles which have only an internal combustion engine as the drive unit, this fuel is for the most part discharged again during longer journeys as a result of the operating temperature of the internal combustion engine being reached.

Furthermore, there are plug-in hybrid vehicles (plug-in hybrid electric vehicle, abbreviation: PHEV), which in addition to the internal combustion engine, have an electrical machine as a further drive unit. In the case of intensive short-distance driving, the internal combustion engine is not heated to the desired operating temperature in a considerable number of journeys, especially in the case of such plug-in hybrid vehicles which, due to their principle, are operated purely electrically in part of the journey or require the internal combustion engine for only a short time for assistance (so-called boost function). This has the result that an increasingly large amount of fuel accumulates in the engine oil. This can cause a fluid-level warning, such as, for example, "oil level too high", to be displayed to the driver. Moreover, an excessive amount of fuel in the engine oil also leads to an impairment of the lubricating properties of the engine oil. In some circumstances, this can also result in permanent damage to the internal combustion engine owing to inadequate lubrication.

A method for operating a drive system of a plug-in hybrid vehicle is known, for example, from DE 10 2008 021 424 A1.

SUMMARY

In an embodiment, the present disclosure provides a drive system of a plug-in hybrid vehicle includes: an internal combustion engine; an electrical machine; an electrochemical storage device, which is configured to supply the electrical machine with electrical energy; and a conditioning system. The conditioning system is configured to precondition the electrochemical storage device and has an electric heating element. the conditioning system is configured, before the start of a journey, to activate a preconditioning function of the internal combustion engine and to preheat a coolant of the internal combustion engine by time-controlled activation of the electric heating element.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 shows a schematic illustration of a drive system of a plug in hybrid vehicle.

DETAILED DESCRIPTION

Embodiments of the present invention provide a drive system of a plug-in hybrid vehicle and a method for operating such a drive system, which can purposively bring about a reduction in the fuel that is introduced into the engine oil of the internal combustion engine of the plug-in hybrid vehicle.

A drive system, according to an embodiment of the invention, of a plug-in hybrid vehicle is distinguished in that the conditioning system is configured, before the start of a journey, to activate a preconditioning function of the internal combustion engine and to preheat a coolant of the internal combustion engine by time-controlled activation of the electric heating element. This preheating advantageously allows the internal combustion engine of the plug-in hybrid vehicle to be preconditioned before the start of a journey, so that increased introduction of fuel into the engine oil of the internal combustion engine can be avoided and as a result potentially inadequate lubrication of moving parts of the internal combustion engine can effectively be prevented.

In an advantageous embodiment, the electric heating element is self-regulating and in particular is in the form of a positive temperature coefficient (PTC) heating element. A PTC heating element is a very robust and inexpensive component.

In a particularly advantageous embodiment, the drive system may have a central control device (central controller), which is designed to control the operation of the internal combustion engine and of the electrical machine, and which is configured so as to activate the preconditioning function of the internal combustion engine and to control the conditioning system such that activation of the electric heating element takes place in a time-controlled manner before the start of a journey.

In a preferred embodiment, the central control device is configured to activate the preconditioning function of the internal combustion engine by interrogation of an activation means (activator) which is coupled with the central control device of the plug-in hybrid vehicle, in particular a calendar memory, a preset departure timer or a learned pattern, which is obtainable by a method of artificial intelligence.

In a method, according to an embodiment of the invention, for operating a drive system of a plug-in hybrid vehicle, wherein the drive system comprises an internal combustion engine, an electrical machine, an electrochemical storage device, which is adapted to supply the electrical machine with electrical energy, and a conditioning system, which is configured to precondition the electrochemical storage device and has an electric heating element, it is provided that, before the start of a journey, a preconditioning function of the internal combustion engine is activated and a coolant of the internal combustion engine is preheated by time-controlled activation of the electric heating element. The method according to an embodiment of the invention advantageously allows the internal combustion engine of the plug-in hybrid vehicle to be preconditioned by preheating the coolant, so that increased introduction of fuel into the engine oil of the internal combustion engine can be avoided and as a result potentially inadequate lubrication of moving parts of the internal combustion engine can effectively be prevented.

In an advantageous embodiment, before the preconditioning function of the internal combustion engine is activated, a plurality of condition data, in particular a current operating temperature of the internal combustion engine, an outside temperature threshold, a switch-off time of the plug-in hybrid vehicle and an oil level threshold of the internal combustion engine, is interrogated and processed, and the activation of the preconditioning function is controlled on the basis of these condition data.

In an advantageous further development, the activation of the preconditioning function of the internal combustion engine is coupled with a fuel introduction model by means of which an introduction of fuel into the internal combustion engine is modeled. If a fuel introduction threshold is exceeded in this fuel introduction model, the preconditioning function of the internal combustion engine is activated at each fresh start of the internal combustion engine or at a number of starts that is determined or to be determined.

Preferably, the preconditioning function of the internal combustion engine can be activated by interrogation of an activation means, in particular a calendar memory, a preset departure timer or a learned pattern, which is obtainable by a method of artificial intelligence.

In an advantageous embodiment, the preconditioning function of the internal combustion engine is activated during a charging process of the electrochemical storage device. The preheating then advantageously has no effect at all on the range of the plug-in hybrid vehicle. Likewise, in one embodiment, independent heating of the coolant with the aid of the electric heating element is also possible when the electric heating element is connected to a power supply device which is not provided for charging the electrochemical energy storage device.

Further features and advantages of embodiments of the present invention will become apparent from the following description of an exemplary embodiment with reference to the accompanying FIG. 1, which shows a schematic illustration of a drive system 1 of a plug-in hybrid vehicle.

The drive system 1 of the plug-in hybrid vehicle has an internal combustion engine 2, which burns fossil fuels in a combustion process, and an electrical machine 17, which allows the plug-in hybrid vehicle to be operated purely electrically at least for part of the journey. The drive system 1 further has an electrochemical energy storage device 3 which is of high-voltage technology and is configured to supply the electrical machine 17 of the drive system 1 of the plug-in hybrid vehicle with electrical energy during operation.

The internal combustion engine 2 always requires a certain operating time to reach its desired operating temperature. During the cold-start phases, in which the desired operating temperature of the internal combustion engine 2 has not yet been reached, a certain amount of fuel is introduced into the engine oil of the internal combustion engine 2. In the case of intensive short-journey driving, the internal combustion engine 2 of such a plug-in hybrid vehicle is not heated to its desired operating temperature in a considerable number of journeys. As a result, it is possible that an increasingly large amount of fuel accumulates in the engine oil. This can cause a fluid-level warning, such as, for example, "oil level too high", to be displayed to the driver. Moreover, an excessive amount of fuel in the engine oil also leads to an impairment of the lubricating properties of the engine oil. In some circumstances this can also result in permanent damage to the internal combustion engine 2 owing to inadequate lubrication.

A method and a system which are capable of bringing about a purposive reduction in the fuel introduced into the engine oil of the internal combustion engine 2 are to be described hereinbelow.

The drive system 1 of the plug-in hybrid vehicle has a conditioning system 4, which is configured to suitably condition the electrochemical energy storage device 3 by heating and optionally also to heat the interior of the plug-in hybrid vehicle by means of an interior heater 10. The conditioning system 4 is functionally expanded and further in the manner set out hereinbelow so that it can purposively also be used for preconditioning a coolant of the internal combustion engine 2.

The conditioning system 4 has an electric heating element 5, which is preferably self-regulating and in this exemplary embodiment is in the form of a PTC heating element (PTC resistor). The electric heating element 5 can be connected to a power supply system. This has been symbolized in FIG. 1 by a corresponding electrical connection cable 6. This electrical connection cable 6 can be, for example, the charging cable by means of which the electrochemical energy storage device 3 of the drive system 1 of the plug-in hybrid vehicle can be connected to a power supply system or to a charging station for charging purposes. It is, however, also possible to provide a separate connection cable 6 in order to be able to operate the electric heating element 5 independently and thus without at the same time charging the electrochemical energy storage device 3.

The conditioning system 4 has a high-temperature stand-alone circuit 7 into which the electric heating element 5 is integrated in order to heat a coolant flowing through the high-temperature stand-alone circuit 7. The conditioning system 4 further has a plurality of valve means 8a, 8b, 8c and at least one pumping unit 9, which are likewise integrated into the high-temperature stand-alone circuit 7. A first fluid feed line 11 of the high-temperature stand-alone circuit 7 leads to the internal combustion engine 2 and can selectively be opened or subsequently closed again by means of a first valve means 8a for preconditioning of the internal combustion engine 2. A second fluid feed line 12 leads to the electrochemical energy storage device 3 and can selectively be opened and subsequently closed by means of a second valve means 8b for conditioning of the electrochemical energy storage device 3. Finally, in the exemplary embodiment shown here there is provided a third fluid feed line 13, which leads to the interior heater 10 and can selectively be opened or closed by means of the third valve means 8c so that heating of the interior of the plug-in hybrid vehicle is also possible.

The conditioning system 4 further comprises a temperature control device 14, which is configured to control the electric heating element 5, which here is in the form of a PTC heating element, the valve means 8a, 8b, 8c and the at least one pumping unit 9. By means of the electric heating element 5, which is preferably self-regulating, electrical energy can be introduced from the charging station into the coolant of the high-temperature stand-alone circuit 7, for example during the charging process of the electrochemical energy storage device 3.

By selectively opening and closing the valve means 8a, 8b, 8c, the flow of coolant to the internal combustion engine 2, to the electrochemical energy storage device 3 and to the interior heater 10 can be controlled in the desired manner. As a result, preconditioning of the internal combustion engine 2 and/or preconditioning of the electrochemical energy storage device 3 and/or heating of the interior of the plug-in hybrid vehicle can be carried out.

The drive system 1 further has a central control device 15 which is configured to control the operation of the internal combustion engine 2 and of the electrical machine 17 of the plug-in hybrid vehicle. By means of the central control device 15, activation or deactivation of the internal combustion engine 2 and of the electrical machine 17 are carried out in particular. Furthermore, the central control device 15 also controls, superordinately, the conditioning system 4.

In the central control device 15 there is implemented a control logic which determines inter alia a suitable temporal classification in order, if possible, to achieve a maximum effect at the time of starting of the internal combustion engine 2. Starting of the internal combustion engine 2 does not necessarily have to take place after the removal of the electrical connection cable 6 from the external power supply device, but can also take place after the plug-in hybrid vehicle has traveled a certain distance in a purely electric mode. The control logic of the preconditioning of the internal combustion engine 2 is thus subordinate to the central control device 15, which then provides corresponding control signals to the temperature control device 14.

Activation of the preconditioning function of the internal combustion engine 2 comprises in particular determining a current operating temperature of the internal combustion engine 2, which is detected with the aid of a coolant sensor, an outside temperature threshold, which is detected by means of an outside temperature sensor means, a switch-off time of the plug-in hybrid vehicle, and an oil level threshold of the internal combustion engine 2, and corresponding processing of these and optionally further data.

Preferably, it can also be provided to couple the activation of the preconditioning function of the internal combustion engine 2 with a fuel introduction model by means of which an introduction of fuel into the internal combustion engine 2 is modeled. If a fuel introduction threshold is exceeded in this fuel introduction model, the preconditioning is activated at each fresh start of the internal combustion engine 2 or at a number of starts that is determined or to be determined.

The frequency of the activation of the preconditioning function can follow from an interrogation of an activation means coupled with the central control device 15 of the plug-in hybrid vehicle, in particular a calendar memory 16, a preset departure timer 18 or a learned pattern 19, which can take account of different ways in which the plug-in hybrid vehicle is used (daily commute on weekdays and other usage behavior at the weekend) and can be obtained, for example, by a method of artificial intelligence, in particular by a trained artificial neural network.

Furthermore, in the case of critical values of the fuel introduction model and a sufficient charge state of the electrochemical energy storage device 3, activation of the preconditioning function of the internal combustion engine 2 is also conceivable independently of the charging operation of the electrochemical storage device 3.

The method presented here advantageously allows the internal combustion engine 2 of the plug-in hybrid vehicle to be preconditioned by preheating of the coolant, so that increased introduction of fuel into the engine oil of the internal combustion engine 2 can effectively be prevented and as a result potentially inadequate lubrication of moving parts of the internal combustion engine 2 can effectively be prevented.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A drive system of a plug-in hybrid vehicle, the drive system comprising:
   an internal combustion engine;
   an electrical machine;
   an electrochemical storage device, which is configured to supply the electrical machine with electrical energy; and
   a conditioning system, which is configured to precondition the electrochemical storage device and comprises an electric heating element,
   wherein the conditioning system is configured to model introduction of fuel into the internal combustion engine with a fuel introduction model,
   wherein the conditioning system is configured to activate a preconditioning function of the internal combustion engine before a cold-start of the internal combustion engine and to preheat a coolant of the internal combustion engine by time-controlled activation of the electric heating element, the activation of the preconditioning function before the cold-start being dependent on an output of the fuel introduction model,
   wherein the drive system comprises a central controller which is configured to control an operation of the internal combustion engine and of the electrical machine, and which is configured to activate the preconditioning function of the internal combustion engine and to control the conditioning system such that activation of the electric heating element takes place in a time-controlled manner before the cold-start of the internal combustion engine,
   wherein the central controller is configured to activate the preconditioning function of the internal combustion engine by interrogation of an activator which is coupled with the central controller of the plug-in hybrid vehicle, and
   wherein the activator comprises a calendar memory, a preset departure timer, or a learned pattern, obtained from machine learning.

2. The drive system as claimed in claim 1, wherein the electric heating element is self-regulating.

3. The drive system as claimed in claim 2, wherein the electric heating element is a positive temperature coefficient heating element.

4. The drive system as claimed in claim 1, wherein the preconditioning system is configured to activate the preconditioning function at each fresh start of the internal combustion engine or at a number of starts of the internal combustion engine based on the fuel introduction model.

5. A method for operating a drive system of a plug-in hybrid vehicle, wherein the drive system comprises:
   an internal combustion engine,
   an electrical machine,
   an electrochemical storage device, which is configured to supply the electrical machine with electrical energy, and
   a conditioning system, which is configured to precondition the electrochemical storage device and comprises an electric heating element,
   the method comprising:
   modeling an introduction of fuel into the internal combustion engine with a fuel introduction model;
   before a cold-start of the internal combustion engine, activating a preconditioning function of the internal combustion engine and preheating a coolant of the internal combustion engine by time-controlled activation of the electric heating element, the activation of the preconditioning function before the cold-start being dependent on an output of the fuel introduction model,
   wherein the drive system comprises a central controller which is configured to control an operation of the internal combustion engine and of the electrical machine, and which is configured to activate the preconditioning function of the internal combustion engine and to control the conditioning system such that activation of the electric heating element takes place in a time-controlled manner before the cold-start of the internal combustion engine,
   wherein the central controller is configured to activate the preconditioning function of the internal combustion engine by interrogation of an activator which is coupled with the central controller of the plug-in hybrid vehicle, and
   wherein the activator comprises a calendar memory, a preset departure timer, or a learned pattern, obtained from machine learning.

6. The method as claimed in claim 5, the method comprising: before activating the preconditioning function of the internal combustion engine, interrogating and processing a plurality of condition data, and controlling the activation of the preconditioning function on the basis of the condition data.

7. The method as claimed in claim 5, wherein the preconditioning function of the internal combustion engine is activated during a charging process of the electrochemical storage device.

8. The method as claimed in claim 6, wherein the condition data comprises an operating temperature of the internal combustion engine, an outside temperature threshold, a switch-off time of the plug-in hybrid vehicle, and an oil level threshold of the internal combustion engine.

9. A drive system of a plug-in hybrid vehicle, the drive system comprising:
   an internal combustion engine;
   an electrical machine;
   an electrochemical storage device, which is configured to supply the electrical machine with electrical energy;
   a heating element configured to preheat a coolant, the coolant being fluidly connected to both the internal combustion engine and the electrochemical storage device; and
   a central controller configured to:
   control an operation of the internal combustion engine and of the electrical machine,
   model introduction of fuel into the internal combustion engine with a fuel introduction model to determine whether a fuel introduction threshold has been exceeded,
   activate a preconditioning function of the internal combustion engine before a cold-start of the internal combustion engine by interrogation of an activator which is coupled with the central controller, the preconditioning function including preheating the coolant of the internal combustion engine via heating of the heating element, and
   control activation of the heating element in a time-controlled manner before the cold-start of the internal combustion engine,
   wherein the activator comprises a calendar memory, a preset departure timer, or a learned pattern, obtained from machine learning.

10. The drive system of claim 9, further comprising a first valve configured to selectively divert the coolant preheated by the heating element to the internal combustion engine and a second valve configured to selectively divert the coolant preheated by the heating element to the electrochemical storage device.

11. The drive system of claim 10, wherein the coolant is fluidly connected to an interior heater configured to heat an interior passenger space of the vehicle, and wherein a third valve is configured to selectively divert coolant preheated by the heating element to the interior heater.

* * * * *